US012459630B2

(12) United States Patent
Budge (10) Patent No.: US 12,459,630 B2
(45) Date of Patent: Nov. 4, 2025

(54) AIRCRAFT WITH LIFT THRUST SYSTEM CONCEALED IN AN AIRFOIL

(71) Applicant: Paul Budge, St. George, UT (US)

(72) Inventor: Paul Budge, St. George, UT (US)

( * ) Notice: Subject to any disclaimer, the term of this patent is extended or adjusted under 35 U.S.C. 154(b) by 165 days.

(21) Appl. No.: 18/098,016

(22) Filed: Jan. 17, 2023

(65) Prior Publication Data

US 2023/0331381 A1  Oct. 19, 2023

Related U.S. Application Data

(60) Provisional application No. 63/361,792, filed on Jan. 24, 2022, provisional application No. 63/361,693, filed on Jan. 14, 2022.

(51) Int. Cl.
*B64C 3/32* (2006.01)
*B64C 15/12* (2006.01)

(52) U.S. Cl.
CPC ............. *B64C 3/32* (2013.01); *B64C 15/12* (2013.01)

(58) Field of Classification Search
CPC .......... B64C 29/0033; B64C 2003/143; B64C 15/12; B64U 30/26; B64U 30/295
See application file for complete search history.

(56) References Cited

U.S. PATENT DOCUMENTS

| | | | |
|---|---|---|---|
| 2,646,945 A | 7/1953 | Perry | |
| 2,936,969 A * | 5/1960 | Griffith | B64C 29/0075 244/12.3 |
| 3,335,977 A * | 8/1967 | Meditz | B64C 3/42 D12/330 |
| 3,752,417 A | 8/1973 | Lagace | |
| 5,320,305 A * | 6/1994 | Oatway | B64C 29/0025 244/12.3 |
| 7,857,254 B2 | 12/2010 | Parks | |
| 9,156,549 B2 * | 10/2015 | Vetters | B64C 29/0025 |
| 9,284,058 B2 * | 3/2016 | Wang | B64D 27/24 |
| 9,714,090 B2 * | 7/2017 | Frolov | B64C 29/0025 |
| 9,783,291 B2 | 10/2017 | Kummer et al. | |
| 10,836,475 B2 * | 11/2020 | Pfaller | B64C 3/14 |
| 11,001,377 B1 | 5/2021 | Robinson et al. | |
| 11,124,308 B2 | 9/2021 | Murrow et al. | |
| 11,142,308 B2 * | 10/2021 | Bucheru | B60V 3/08 |
| 11,148,797 B1 * | 10/2021 | Robertson | B64C 1/0009 |
| 11,548,621 B1 | 1/2023 | Robinson et al. | |
| 2006/0192046 A1 | 8/2006 | Heath et al. | |
| 2020/0207468 A1 | 7/2020 | Bucheru | |
| 2021/0300540 A1 | 9/2021 | Robertson et al. | |
| 2021/0339879 A1 | 11/2021 | Murrow et al. | |

OTHER PUBLICATIONS

PCT/US2023/010968, "Notification of Transmittal of the International Search Report and the Written Opinion of the International Searching Authority, or the Declaration", International Searching Authority, Sep. 28, 2023, pp. 1-11.

* cited by examiner

*Primary Examiner* — Brian M O'Hara
(74) *Attorney, Agent, or Firm* — Kunzler Bean & Adamson (57) ABSTRACT

Aircraft and airfoils for more efficient flight operations using electric motors. An aircraft includes an airfoil and a thrust device rotatably mounted within the airfoil. An airfoil includes a top surface, a bottom surface, a compartment disposed between the top surface and the bottom surface, and a thrust device rotatably mounted within the compartment.

16 Claims, 11 Drawing Sheets

AIRCRAFT WITH LIFT THRUST SYSTEM CONCEALED IN AN AIRFOIL

CROSS-REFERENCE TO RELATED APPLICATION

This application claims the benefit of U.S. Provisional Patent Application Nos. 63/361,693, filed Jan. 14, 2022, and 63/361,792, filed Jan. 24, 2022, which are incorporated herein by reference.

FIELD

This disclosure relates generally to vertical take-off and landing (VTOL) and short take-off and landing (STOL) aircraft.

BACKGROUND

Currently known vertical take-off and landing aircraft use very large propellers, rotor blades, turbofan engines, or ducted electric fans to provide upward vertical thrust for takeoff and vertical flight. These methods work great for providing short duration lift, but are not very aerodynamic causing turbulence due to large amounts of drag. To address the excess drag issues, some aircraft use complex doors, sliding panels, louvers, or shutters to conceal or seal-off the lift thrust systems, but these systems are complex.

SUMMARY

Aircraft and airfoils are disclosed for more efficient flight operations using electric motors. In one embodiment, an aircraft includes an airfoil and a thrust device rotatably mounted within the airfoil.

In another embodiment, an airfoil includes a top surface, a bottom surface, a compartment disposed between the top surface and the bottom surface, and a thrust device rotatably mounted within the compartment.

In still another embodiment, an aircraft includes a sensor configured to sense conditions of the aircraft; flight controls configured to provide flight control signals, an airfoil, a thrust device rotatably mounted within the airfoil, an actuator configured to rotate the thrust device from a first orientation configured to provide vertical thrust to a second orientation within the airfoil, and a controller configured to provide control signals to the thrust device and the actuator based on the sensed conditions and the flight control signals. The thrust device includes a top surface configured to seal with a top surface of the airfoil and a bottom surface configured to seal with a bottom surface of the airfoil.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Reference throughout this specification to "one embodiment" "an embodiment" or similar language means that a particular structure or characteristic feature described in connection with the embodiment is included in at least one embodiment of the disclosed invention. Furthermore, the described structures or characteristics of the invention may be combined in any suitable manner in one or more embodiments. In the following description, numerous specific details are provided to give a thorough understanding of embodiments of the disclosed invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Exemplary aircraft, disclosed herein, include thrust systems that are embedded within airfoils of the aircraft. During take-off and landing, or vertical flight, the thrust system may be rotated to provide an alternative thrust profile. When transitioning to forward or cruise flight, the thrust system rotates to be hidden within the respective airfoil.

Figure 1:
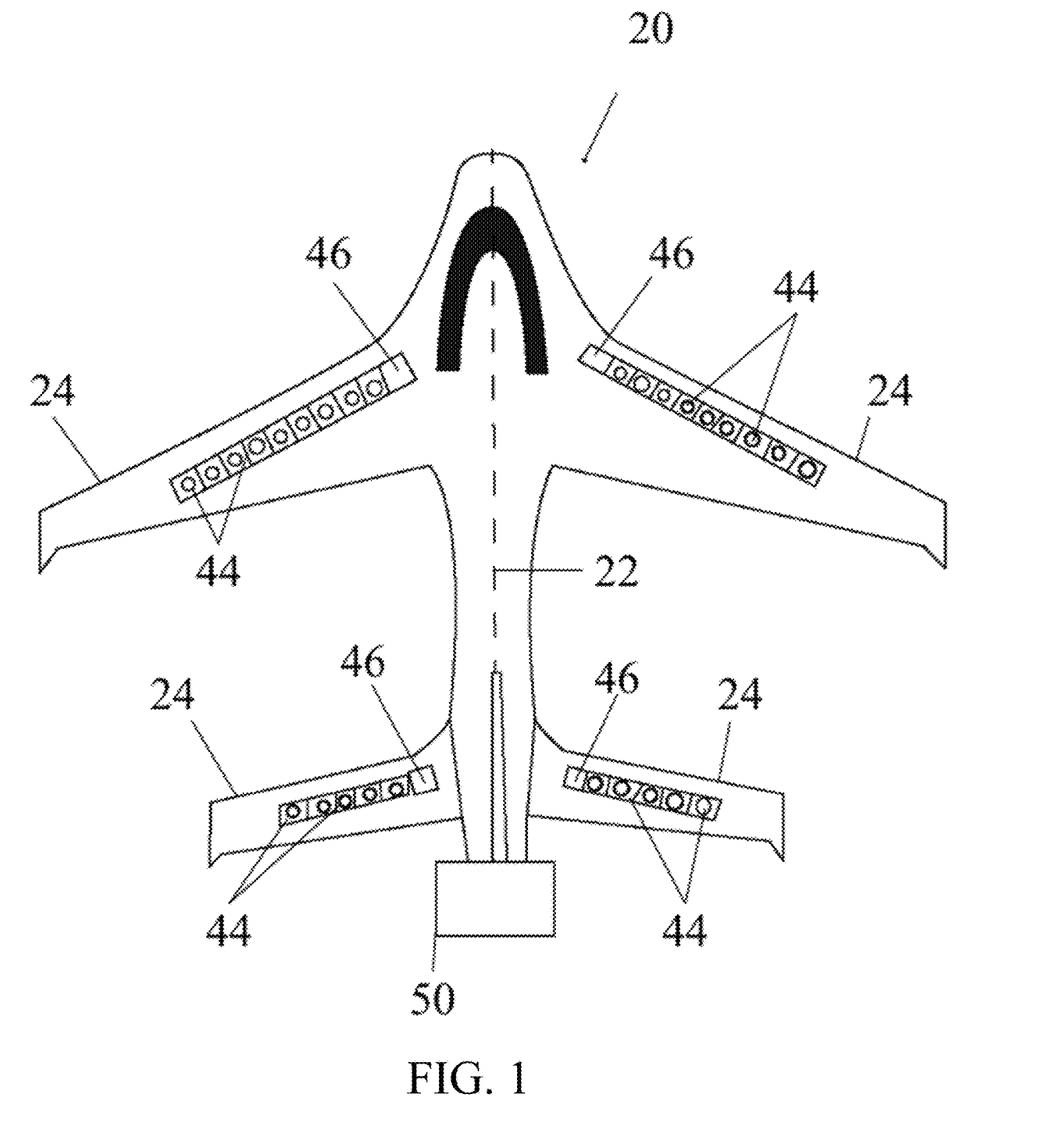
FIG. 1 is a top plan view of an aircraft, according to one or more examples of the present disclosure.
Figure 2:
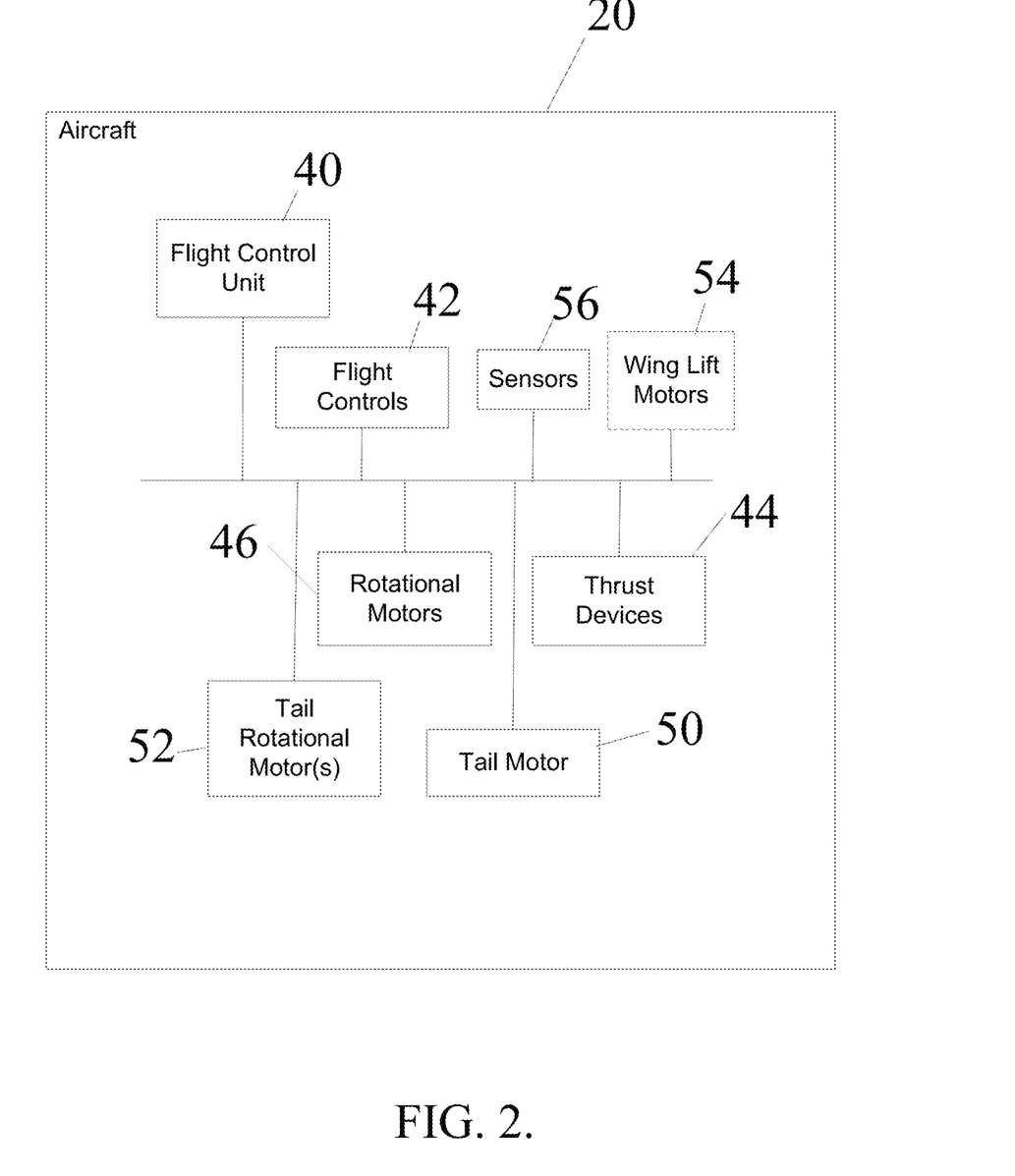
FIG. 2 is a system block diagram of components of the aircraft of FIG. 1, according to one or more examples of the present disclosure.

In various embodiments, referring to FIGS. 1 and 2, an aircraft 20 includes a fuselage 22, airfoils 24 attached to the fuselage 22. In other embodiments, the aircraft 20 may be a blended body aircraft wing design. Embedded in some or all of the airfoils 24 are at least one airfoil rotational motor 46 and a plurality of thrust devices 44. Examples of the thrust devices 44 may be a compressed gas thrust device, electric ducted fan motors, plasma thrust devices, jet turbines, or the like. Each of the actuators 46 are coupled to the plurality of thrust devices 44 or to multiple groups of thrust devices 44. The actuators 46 may include dual winding motors, hydraulic motors, rotational motors, or the like. Each of the airfoils 24 may include multiple groups of thrust devices 44 and associated actuator(s) 46. Each of the groups of thrust devices 44 and associated actuator(s) 46 may be separately controllable for providing pitch, roll, and yaw forces for at least enabling stable hovering. The actuators 46 are configured to rotate the thrust devices 44 to a vertical thrust orientation, a horizontal/cruise thrust orientation, and/or any orientation between the vertical and horizontal thrust orientations. The aircraft 20 also includes an aft motor 50 coupled to a tail rotational motor(s) 52. Examples of the aft motor 50 may be propeller or ducted fan motors, gas engines, jet engines, or the like. The tail rotational motor(s)/actuator(s) 52 is configured to rotate the aft motor 50 so that the aft motor 50 may provide horizontal thrust, vertical thrust, and/or off longitudinal/vertical axis thrust.

Referring the FIG. 2, the aircraft 20 may include a flight control unit (FCU) 40 that is in data communication with sensors 56, flight controls 42, the thrust devices 44, the actuators 46, the tail rotational motor(s) 52, and the aft motor 50 via a data bus. The flight controls 42 generate flight control signals based on input from a pilot and the sensors 56, such as, without limitations, gyroscopes, air pressure sensors, or the like. The FCU 40 uses the flight control signals to generate motor power control signals and rotational motor control signals that are sent to the airfoil thrust devices 44, the actuators 46, the aft motor 50, and/or the tail rotational motor(s) 52.

Figure 3:
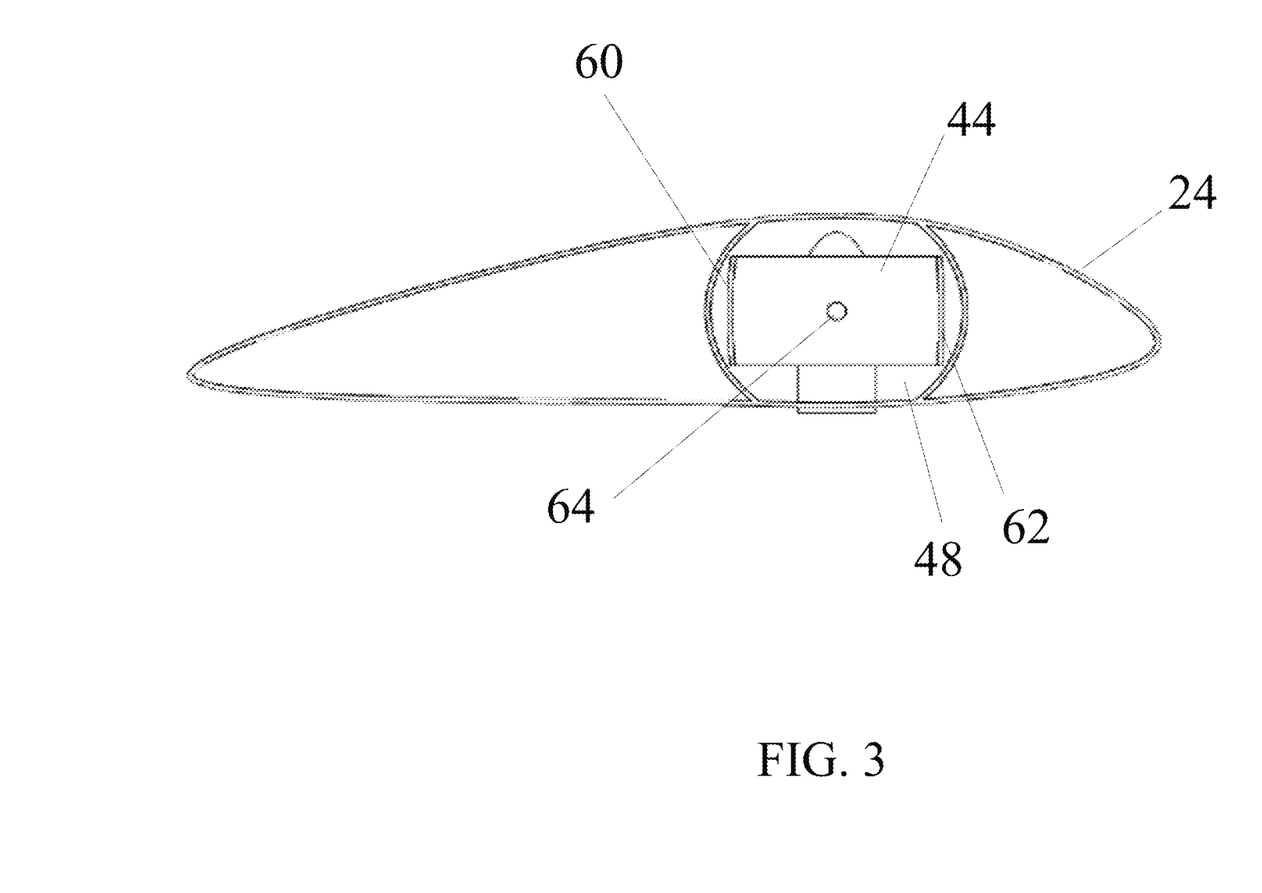
FIG. 3 is a cross-sectional view of an airfoil, according to one or more examples of the present disclosure.
Figure 4:
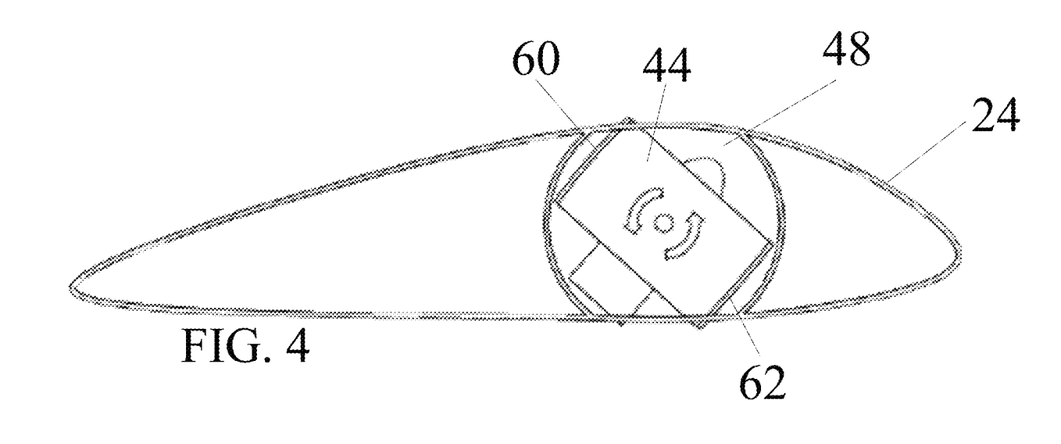
FIG. 4 is a cross-sectional view of the airfoil of FIG. 4, according to one or more examples of the present disclosure.
Figure 5:
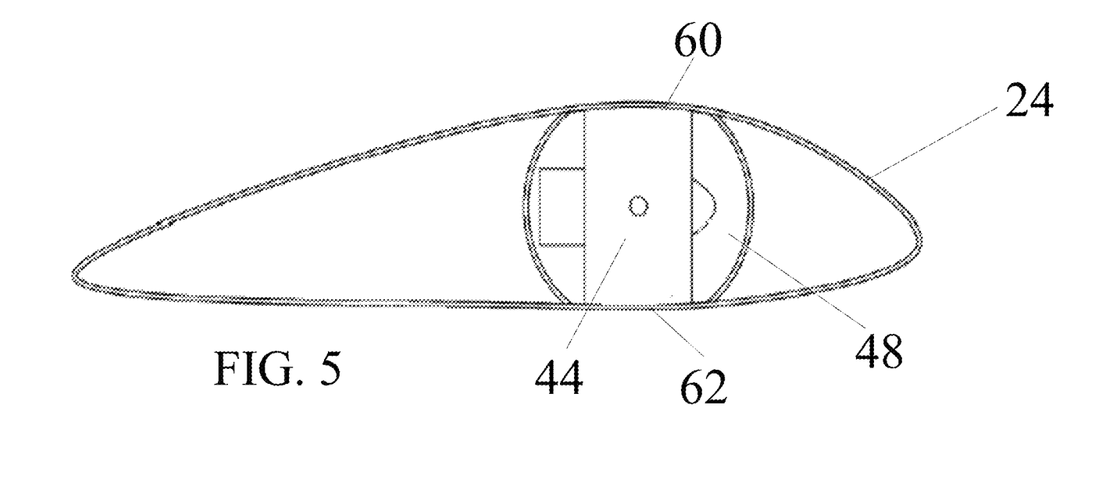
FIG. 5 is a cross-sectional view of the airfoil of FIG. 4, according to one or more examples of the present disclosure.
Figures 6, 7, 8:
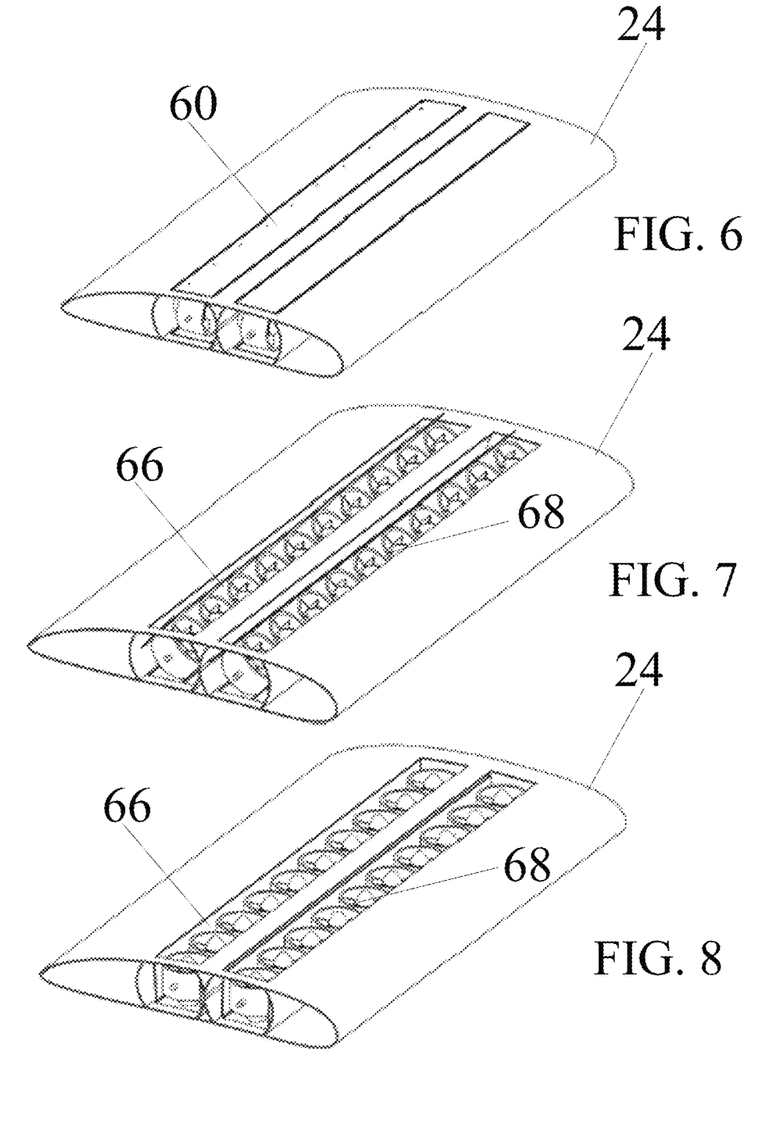
FIG. 6 is a perspective view of an airfoil, according to one or more examples of the present disclosure.
FIG. 7 is a perspective view of the airfoil of FIG. 6, according to one or more examples of the present disclosure.
FIG. 8 is a perspective view of the airfoil of FIG. 6, according to one or more examples of the present disclosure.
Figure 9:
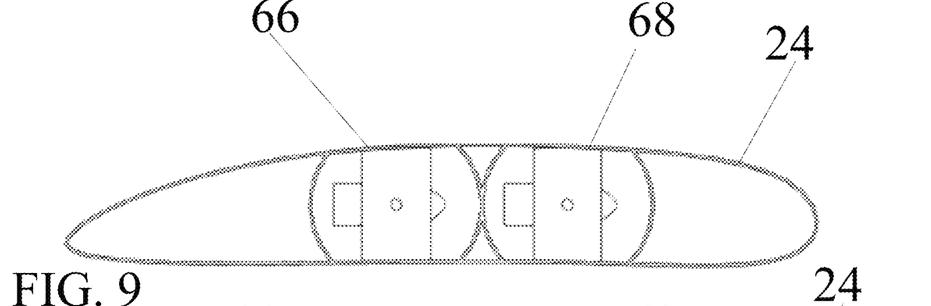
FIG. 9 is a cross-sectional view of the airfoil of FIG. 6, according to one or more examples of the present disclosure.
Figure 10:
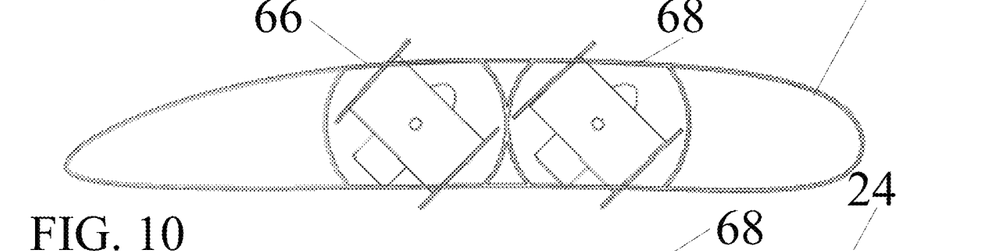
FIG. 10 is a cross-sectional view of the airfoil of FIG. 6, according to one or more examples of the present disclosure.
Figure 11:
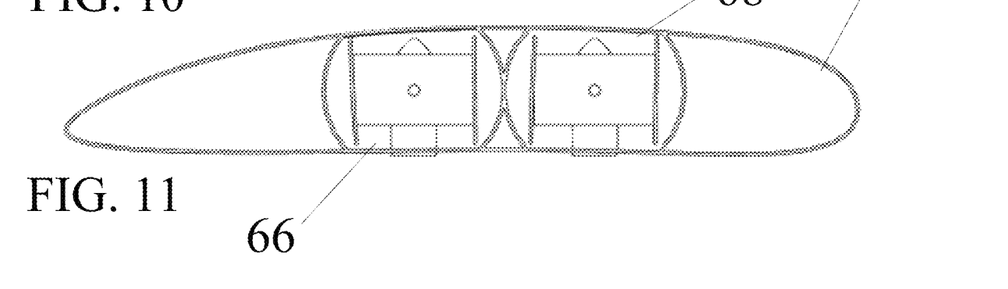
FIG. 11 is a cross-sectional view of the airfoil of FIG. 6, according to one or more examples of the present disclosure.

In various embodiments, referring to FIGS. 3-5, the thrust devices 44 are rotatably mounted about an axis 64 within a compartment 48 of the airfoil 24. A shaft (not shown) that connects adjacent thrust devices 44 to one or more of the actuators 46 extends into the fuselage 22, thus allowing the shaft and the adjacent thrust devices 44 to provide structural strength for the aircraft 20. The axis 64 is approximately perpendicular to a longitudinal axis of the fuselage 22. The actuators 46 rotate the thrust devices 44 within the compartment 48 between a vertical thrust orientation (FIG. 3) to a stowed orientation (FIG. 5). In a vertical thrust mode, the thrust devices 44 are rotated such that longitudinal axes of the airfoil thrust devices 44 are approximately perpendicular to the longitudinal axis of the fuselage 22 for providing vertical or near vertical thrust. In the vertical thrust mode, the airfoil thrust devices 44 receive air at the top surface of the airfoil 24 or an intake end of the airfoil thrust devices 44 and expel air at a bottom side of the airfoil 24 or an exhaust end of the airfoil thrust devices 44, thereby producing upward lift. The airfoil thrust devices 44 located in different airfoils 24 may be separately tilted at different angles to provide for stabilizing thrust (pitch, roll, or yaw thrust) for the aircraft 20.

As the aircraft 20 is transitioning from the vertical thrust mode to a stowed mode, the airfoil thrust devices 44 are rotated by the actuators 46, such that the airfoil thrust devices 44 are fully contained within a profile of the airfoil 24 (FIGS. 4 and 5). When the airfoil thrust devices 44 are fully stowed in the compartment 48, a top plate 60 of the airfoil thrust devices 44 is shaped to match a top surface of the airfoil 24 and a bottom plate 62 of the airfoil thrust devices 44 is configured to match a bottom surface of the airfoil 24. The top plate 60 and the bottom plate 62 are sized in order to seal and/or provide continuity of the respective surface of the airfoil 24. The top and bottom plates 60, 62 may be square and/or rectangular in shape, but other shapes may be used.

In various embodiments, a small flap (not shown) may be coupled to the airfoil thrust devices 44 or the plates 60, 62 to provide more lift or produce air braking when transitioning to vertical lift flight, slowing down to land, or slowing after landing rollout on a runway.

In various embodiments, referring to FIG. 6-11, the airfoil 24 may include multiple rows of thrust devices, such as an aft row of thrust devices 66 and a forward row of thrust devices 68 as illustrated. The rows of thrust devices rotate and seal similar to the thrust devices 44 shown in FIGS. 3-5. The multiple rows of thrust devices may be driven by the same or separate rotational motors.

Figure 12:
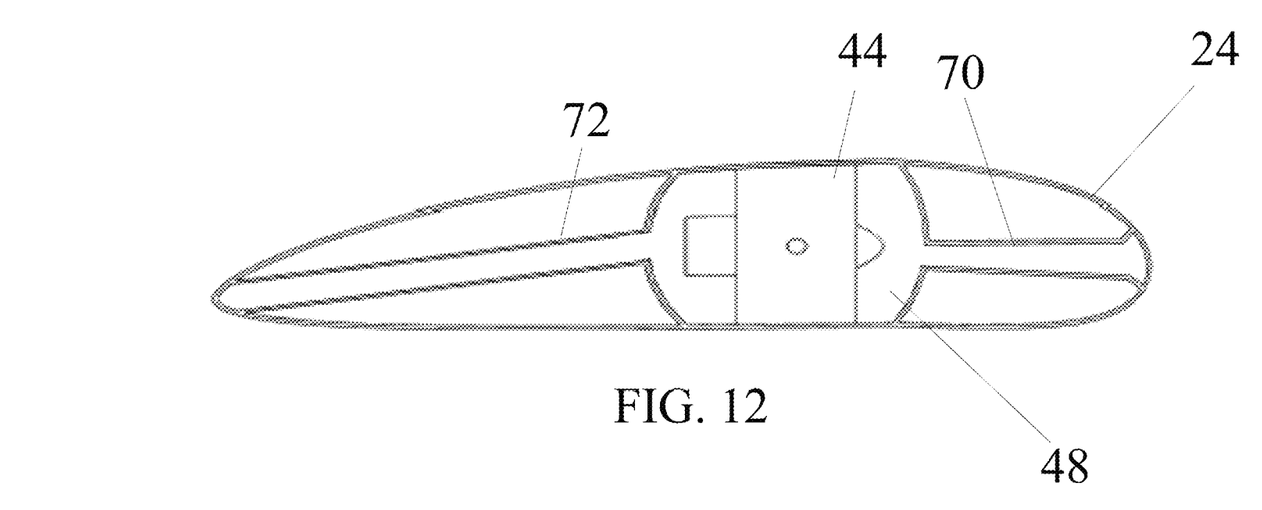
FIG. 12 is a cross-sectional view of an airfoil, according to one or more examples of the present disclosure.

In various embodiments, referring to FIG. 12, the airfoil 24 may include a first longitudinal cavity 70 located between the airfoil thrust devices 44 and an opening at a leading edge of the airfoil 24. The airfoil 24 may also include an aft longitudinal cavity 72 that extends aft of the compartment 48 to an opening at a trailing edge of the airfoil 24. In this configuration, the airfoil thrust motor 44 may continue providing horizontal thrust while being sealed within the airfoil 24. In various embodiments, the leading edge of the airfoil 24 may include a door and a door motor (not shown) that is activated to open the door simultaneously with the airfoil trust motor 44 being placed in a horizontal thrust mode.

Figure 13:
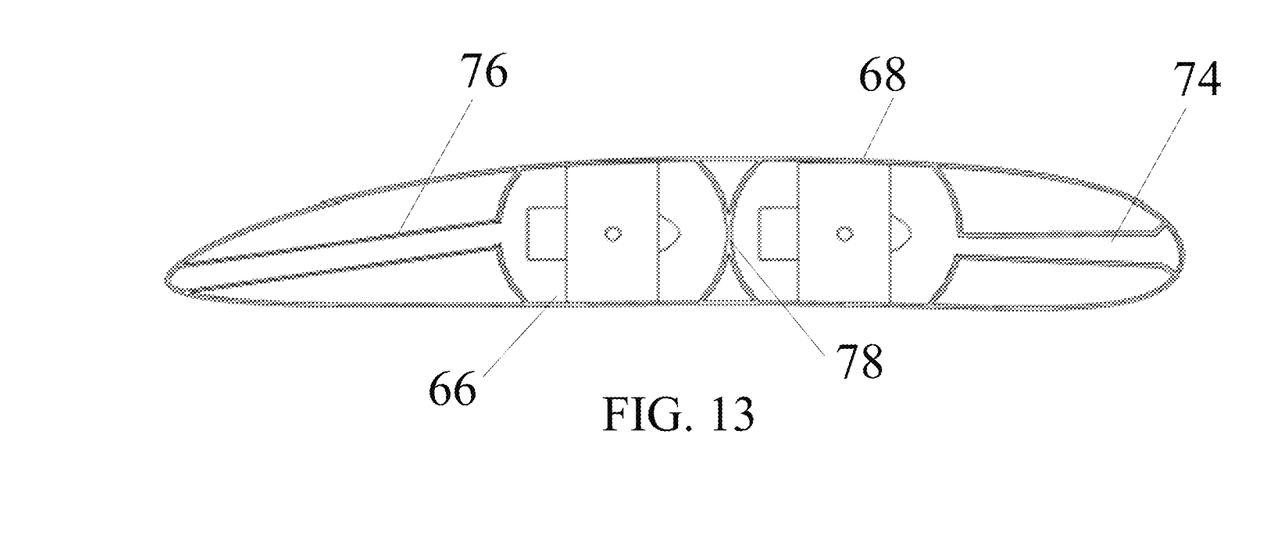
FIG. 13 is a cross-sectional view of an airfoil, according to one or more examples of the present disclosure.

In various embodiments, referring to FIG. 13, the airfoil 24 may include a first longitudinal cavity 74 located between the airfoil thrust devices 44 and an opening at a leading edge of the airfoil 24. The airfoil 24 may also include an aft longitudinal cavity 76 that extends aft of the compartment 48 to an opening at a trailing edge of the airfoil 24 and a passageway 78 that links a cavity of the aft row of thrust devices 66 to a cavity of the forward row of thrust devices 68. In this configuration, the airfoil thrust motor 44 may continue providing horizontal thrust while being sealed within the airfoil 24. In various embodiments, the leading edge of the airfoil 24 may include a door and a door motor (not shown) that is activated to open the door simultaneously with the airfoil trust motor 44 being placed in a horizontal thrust mode.

Figure 14:
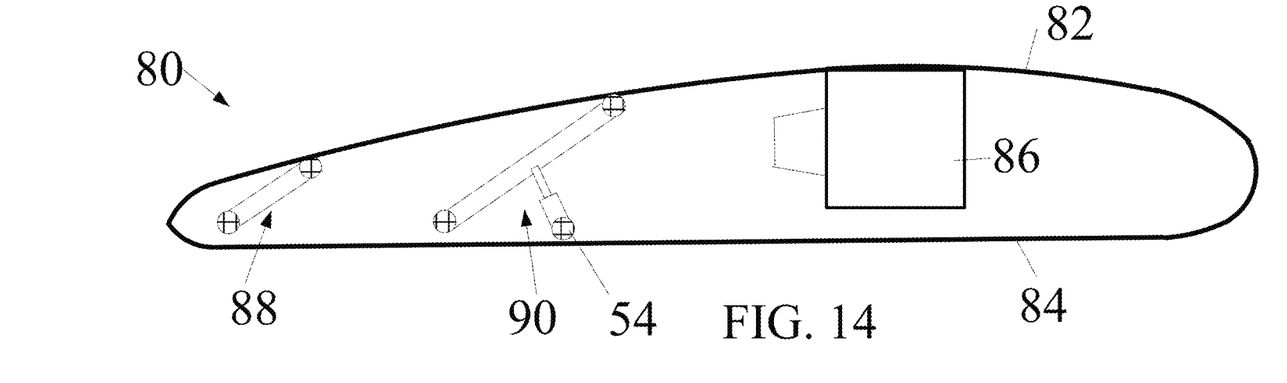
FIG. 14 is a cross-sectional view of an airfoil, according to one or more examples of the present disclosure.
Figure 15:
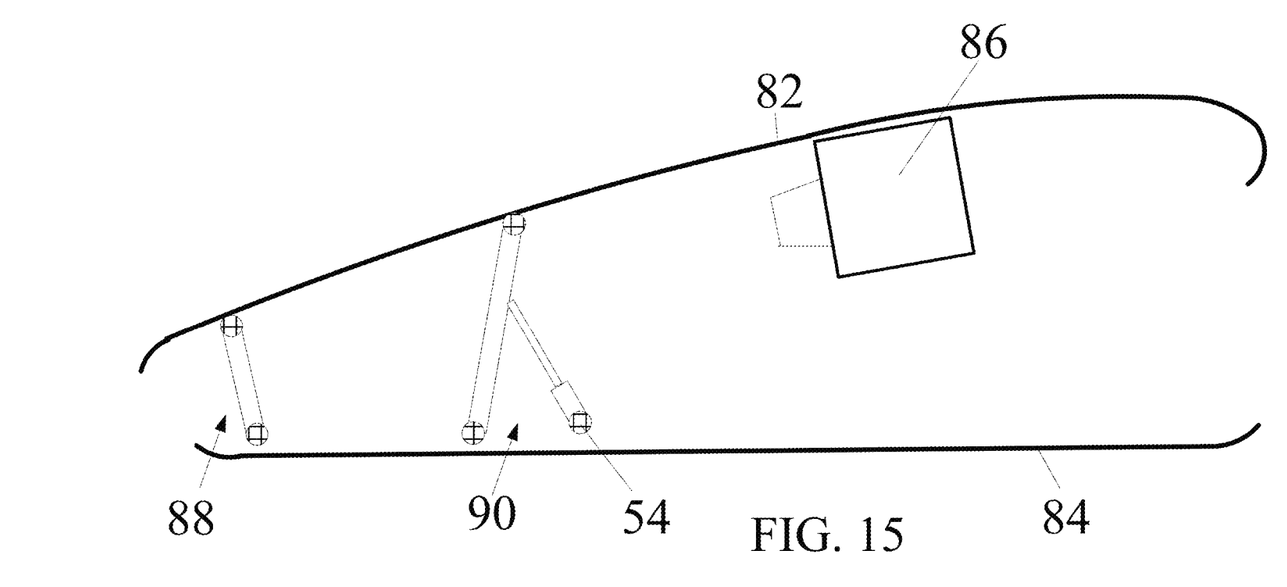
FIG. 15 is a cross-sectional view of the airfoil of FIG. 14, according to one or more examples of the present disclosure.

In various embodiments, referring to FIGS. 14 and 15, an airfoil 80 includes an embedded thrust motor(s) 86 that is attached to an underside of an upper airfoil surface 82. The upper airfoil surface 82 is detachable from a sealed configuration (FIG. 14) with a lower airfoil surface 84. The upper airfoil surface 82 is attached to the lower airfoil surface 84 or a frame structure (not shown) via a first rotating arm(s) 88 and a second rotating arm(s) 90. The wing lift motor(s) 54 is attached to the second rotating arm(s) 90 and may be controlled by the FCU 40 to position the airfoil 80 in the sealed configuration (FIG. 14) or in a vectored thrust configuration (FIG. 15). In the vectored thrust configuration, the wing lift motor(s) 54 causes a forward rotatable attachment point of the second rotating arm(s) 90 to rotate up and toward an aft rotatable attachment point of the second rotating arm(s) 90. The first attachment point is rotatably attached to the upper airfoil surface 82. The second attachment point is rotatably attached to the lower airfoil surface 84 or the frame structure. In the vectored thrust configuration, the embedded thrust motor(s) 86 may be activated, thereby providing thrust having both vertical and horizontal lift values.

Figure 16:
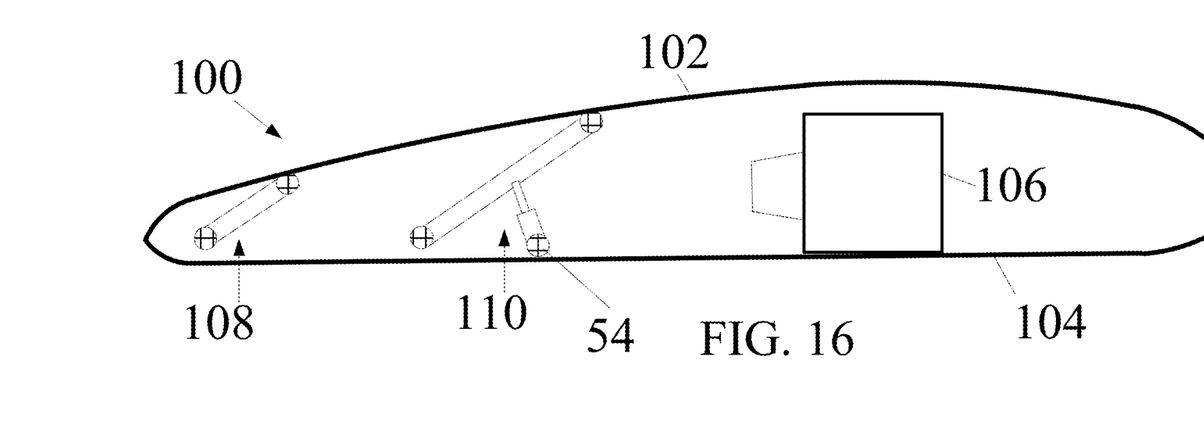
FIG. 16 is a cross-sectional view of an airfoil, according to one or more examples of the present disclosure.
Figure 17:
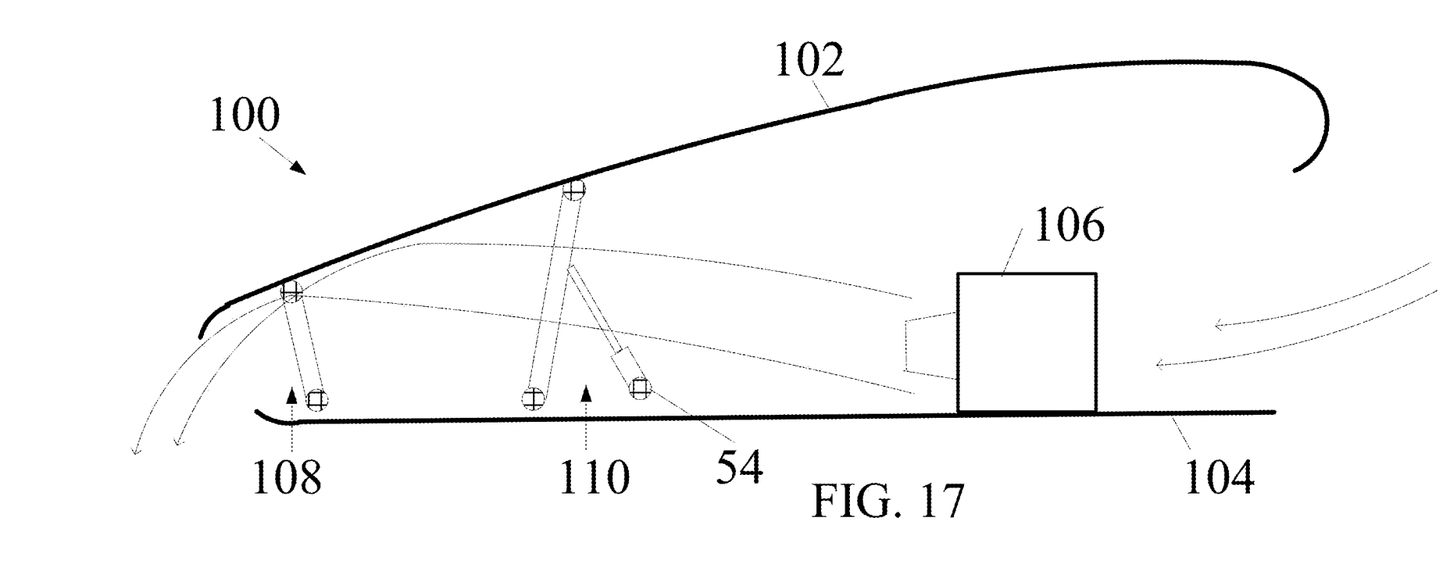
FIG. 17 is a cross-sectional view of the airfoil of FIG. 16, according to one or more examples of the present disclosure.

In various embodiments, referring to FIGS. 16 and 17, an airfoil 100 includes an embedded thrust motor(s) 106 that is attached to an inner side of a lower airfoil surface 104. An upper airfoil surface 102 is detachable from a sealed configuration (FIG. 16) with the lower airfoil surface 104. The upper airfoil surface 102 is attached to the lower airfoil surface 104 or a frame structure (not shown) via a first rotating arm(s) 108 and a second rotating arm(s) 110. The wing lift motor(s) 54 is attached to the second rotating arm(s) 110 and may be controlled by the FCU 40 to position the upper airfoil surface 102 in the sealed configuration (FIG. 16) or in a vectored thrust configuration (FIG. 17). In the vectored thrust configuration, the wing lift motor(s) 54 causes a forward rotatable attachment point of the second rotating arm(s) 110 to rotate up and toward an aft rotatable attachment point of the second rotating arm(s) 110. The forward rotatable attachment point is rotatably attached to the upper airfoil surface 102. The aft rotatable attachment point is rotatably attached to the lower airfoil surface 104 or the frame structure. In the vectored thrust configuration, the embedded thrust motor(s) 106 may be activated, thereby providing thrust having both vertical and horizontal lift values due to exhaust of the embedded thrust motor(s) 106 being deflected downward by the upper airfoil surface 102.

It can be appreciated by one of ordinary skill in the art that other lifting structures and motor configurations may be used to move the upper airfoil surfaces 82, 102 relative to the lower airfoil surfaces 84, 104. In both configurations shown in FIGS. 14-17, the upper airfoil surfaces 82, 102 also acts as an airbrake or a spoiler when in the vectored thrust configuration. The airbrake effect may be utilized without activation of the embedded thrust motors 86, 106 during landing rollout for slowing down aircraft or during descent to landing for slowing down the aircraft and/or increasing rate of descent.

Figure 18:
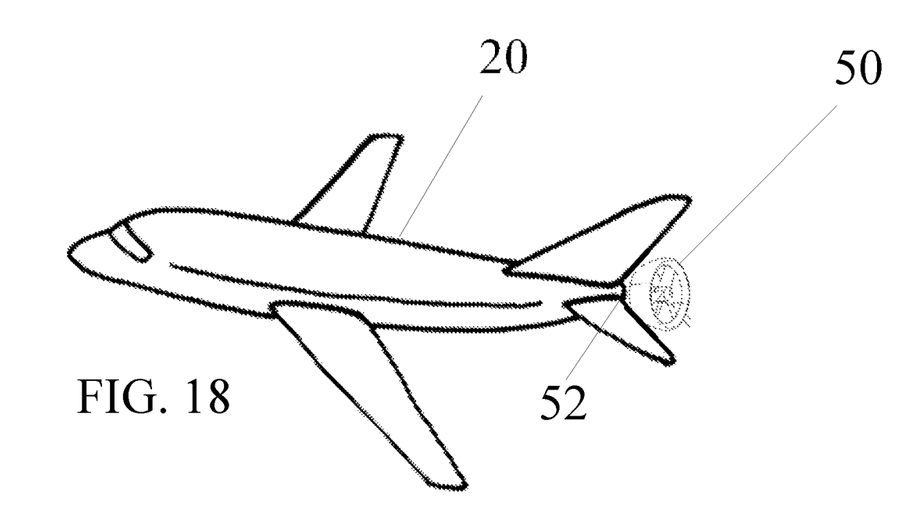
FIG. 18 is a perspective view of the aircraft of FIG. 1, according to one or more examples of the present disclosure.
Figure 19:
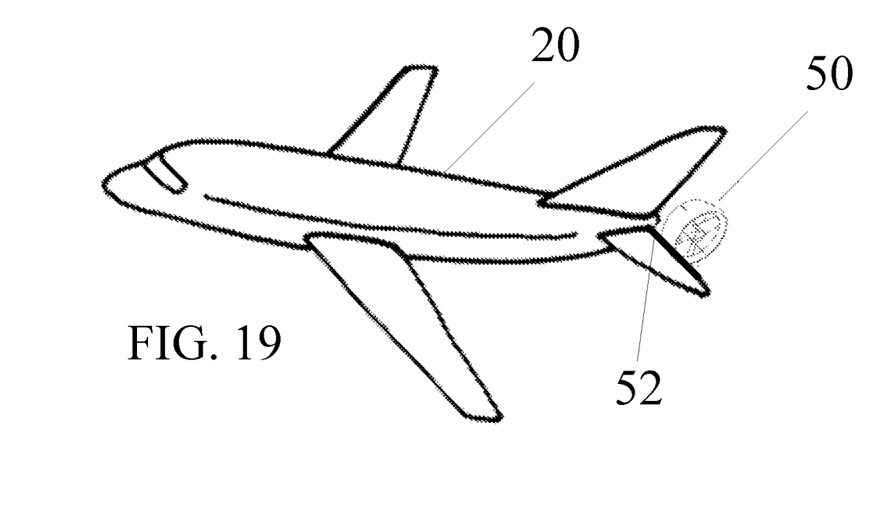
FIG. 19 is a perspective view of the aircraft of FIG. 1, according to one or more examples of the present disclosure.
Figure 20:
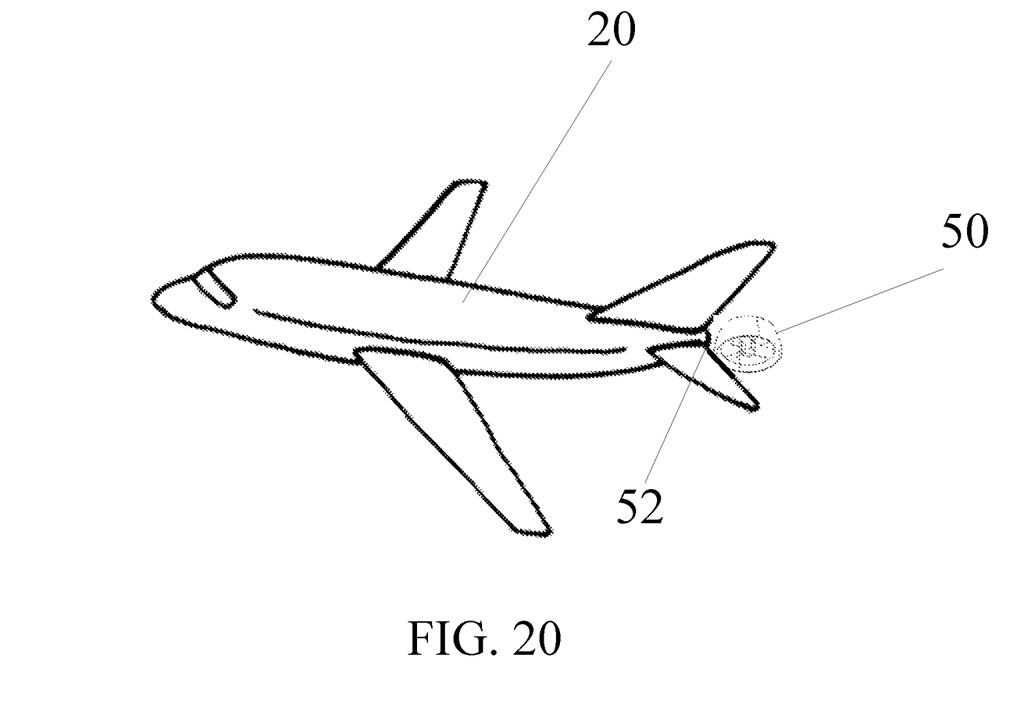
FIG. 20 is a perspective view of the aircraft of FIG. 1, according to one or more examples of the present disclosure.

In various embodiments, referring to FIGS. 18-20, the aft motor 50 may be rotated by the tail rotational motor(s) 52 to provide horizontal thrust for cruise operations (FIG. 18), vertical thrust for hover operations (FIG. 20), or off-horizontal/vertical axis thrust. The aft motor 50 may attain a variety of positions between the cruise operational mode position and the vertical thrust mode position. In the vertical thrust mode position, the aft motor 50 may be rotated off of a pure vertical axis in a 360° range for providing stabilizing forces for the aircraft 20.

Embodiments

A. An aircraft comprising: an airfoil; and a thrust device rotatably mounted within the airfoil.

B. The aircraft of A, further comprising an actuator configured to rotate the thrust device from a first orientation configured to provide vertical thrust to a second orientation within the airfoil.

C. The aircraft of A or B, wherein the thrust device comprises: a top surface configured to seal with a top surface of the airfoil; and a bottom surface configured to seal with a bottom surface of the airfoil.

D. The aircraft of any of A-C, wherein the airfoil comprises: a leading edge; a trailing edge; a thrust device cavity configured to receive the thrust device; an intake cavity located between the leading edge and the thrust device cavity; and an exhaust cavity located between the trailing edge and the thrust device cavity.

E. The aircraft of any of A-D, wherein the thrust device comprises a plurality of thrust motors.

F. The aircraft of E, wherein: the thrust device comprises a plurality of groups of thrust motors; the actuator comprises a plurality of rotational motors associated with each of the plurality of groups of thrust motors; and the aircraft further comprising a controller configured to separately control the groups of thrust motors and the plurality of rotational motors.

G. The aircraft of any of A-F, further comprising an external thrust device located external to the airfoil.

H. The aircraft of G, wherein the external thrust device comprises an electric propeller device or an electric ducted fan device.

I. The aircraft of H, further comprising an actuator configured to rotate the external thrust device to provide horizontal thrust, vertical thrust, or a combination of horizontal and vertical thrust.

J. The aircraft of any of A-I, wherein: the airfoil comprises: a lower surface; and an upper surface detachable from the lower surface; a lifting device hingedly attached to the upper surface and the lower surface; and a controller configured to cause the lifting device to increase an angle of attack of the upper surface by rotating the upper surface away from the lower surface.

K. The aircraft of J, wherein the thrust device is attached to an underside of the upper surface.

L. The aircraft of J, wherein the thrust device is attached to an upper surface of the lower surface.

M. An airfoil comprising: a top surface; a bottom surface; a compartment disposed between the top surface and the bottom surface; and a thrust device rotatably mounted within the compartment.

N. The airfoil of M, further comprising an actuator configured to rotate the thrust device from a first orientation configured to provide vertical thrust to a second orientation within a the airfoil.

O. The airfoil of M or N, wherein the thrust device comprises: a top surface configured to seal with a top surface of the airfoil in the second orientation; and a bottom surface configured to seal with a bottom surface of the airfoil in the second orientation.

P. The airfoil of any of M-O, wherein the thrust device comprises a plurality of thrust motors.

Q. The airfoil of any of M-P, wherein the airfoil comprises: a leading edge; a trailing edge; an intake cavity located between the leading edge and the compartment; and an exhaust cavity located between the trailing edge and the compartment.

R. The airfoil of M, further comprising: a lifting device hingedly attached to the top surface and the bottom surface; and a motor configured to cause the lifting device to increase an angle of attack of the top surface by rotating the top surface away from the bottom surface.

S. The airfoil of R, wherein the thrust device is attached to an underside of the top surface.

T. The airfoil of R, wherein the thrust device is attached to an upper surface of the bottom surface.

U. An aircraft comprising: a sensor configured to sense conditions of the aircraft; flight controls configured to provide flight control signals; an airfoil; a thrust device rotatably mounted within the airfoil, the thrust device comprises: a top surface configured to seal with a top surface of the airfoil; and a bottom surface configured to seal with a bottom surface of the airfoil; an actuator configured to rotate the thrust device from a first orientation configured to provide vertical thrust to a second orientation within the airfoil; and a controller configured to provide control signals to the thrust device and the actuator based on the sensed conditions and the flight control signals.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller/processor, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit/processor or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, a transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An aircraft comprising:
a fuselage;
an airfoil attached to the fuselage and comprising a wing, the wing comprising:
a top surface having a first opening;
a bottom surface having a second opening; and
a cavity extending from the first opening to the second opening; and
a thrust device connected to a plate, the thrust device rotatably mounted within the cavity, and configured to rotate with the plate about an axis within the cavity from a vertical orientation to a horizontal orientation, and the plate is shaped to match the top or bottom surface,
wherein, in the horizontal orientation, the plate seals one of the first or second openings and provides continuity of the top or bottom surface, and
wherein, in the vertical orientation, a longitudinal axis of the thrust device is substantially perpendicular to a longitudinal axis of the fuselage and the thrust device is configured to provide vertical thrust.

2. The aircraft of claim 1, further comprising an actuator configured to rotate the thrust device from the vertical orientation to the horizontal orientation within the airfoil.

3. The aircraft of claim 2, wherein the thrust device comprises a plurality of thrust motors.

4. The aircraft of claim 3, wherein:
the thrust device comprises a plurality of groups of thrust motors;
the actuator comprises a plurality of actuators associated with each of the plurality of groups of thrust motors; and
the aircraft further comprising a controller configured to separately control the groups of thrust motors and the plurality of actuators.

5. The aircraft of claim 1, wherein:
the cavity comprises a thrust device cavity configured to receive the thrust device; and
the airfoil comprises:
a leading edge;
a trailing edge;
an intake cavity located between the leading edge and the thrust device cavity; and
an exhaust cavity located between the trailing edge and the thrust device cavity.

6. The aircraft of claim 1, further comprising an external thrust device located external to the airfoil.

7. The aircraft of claim 6, wherein the external thrust device comprises an electric propeller device or an electric ducted fan device.

8. The aircraft of claim 7, further comprising an actuator configured to rotate the external thrust device to provide horizontal thrust, vertical thrust, or a combination of horizontal and vertical thrust.

9. An aircraft comprising:
an airfoil attached to a fuselage and comprising a wing, the wing comprising:
a top surface having a first opening;
a bottom surface having a second opening;
a compartment disposed between the top surface and the bottom surface, and
extending between the first and second opening; and
a thrust device comprising a thrust-device surface, rotatably mounted within the compartment, the thrust device configured to rotate about an axis within the compartment from a vertical orientation to a horizontal orientation, and the thrust-device surface is shaped to match the top or bottom surface
wherein, in the horizontal orientation the thrust-device surface forms a seal of the compartment with the thrust-device surface and at least one of the top surface first opening and the bottom surface second opening,
wherein, in a vertical orientation, a longitudinal axis of the thrust device is substantially perpendicular to a longitudinal axis of the fuselage to which the airfoil is attached and the thrust device is configured to provide vertical thrust.

10. The aircraft of claim 9, further comprising an actuator configured to rotate the thrust device from the vertical orientation the horizontal orientation within the airfoil.

11. The aircraft of claim 10, wherein:
the thrust-device surface comprises:
a top thrust-device surface configured to seal with the top surface of the airfoil in the horizontal orientation; and
a bottom thrust-device surface configured to seal with the bottom surface of the airfoil in the horizontal orientation.

12. The aircraft of claim 2, wherein the actuator is further configured to rotate a plurality of additional thrust devices with the thrust device to form the seal.

13. The aircraft of claim 12, wherein each of the thrust device and the plurality of additional thrust devices are rotatably mounted about the axis within the cavity and the axis is substantially perpendicular to the longitudinal axis of the fuselage and to the longitudinal axis of the thrust device.

14. The airfoil of claim 11, wherein the top thrust-device surface is shaped to form a continuous surface with the top surface of the airfoil when sealed with the top surface of the airfoil in the horizontal orientation.

15. The aircraft of claim 14, wherein the bottom thrust-device surface is shaped to form an additional continuous surface with the bottom surface of the airfoil when sealed with the bottom surface of the airfoil in the horizontal orientation.

16. The aircraft of claim 12, wherein the plurality of additional thrust devices are arranged in a row with the thrust device.

* * * * *